No. 825,841. PATENTED JULY 10, 1906.
G. D. KIFER.
CURRENT WATER WHEEL.
APPLICATION FILED MAR. 27, 1905.
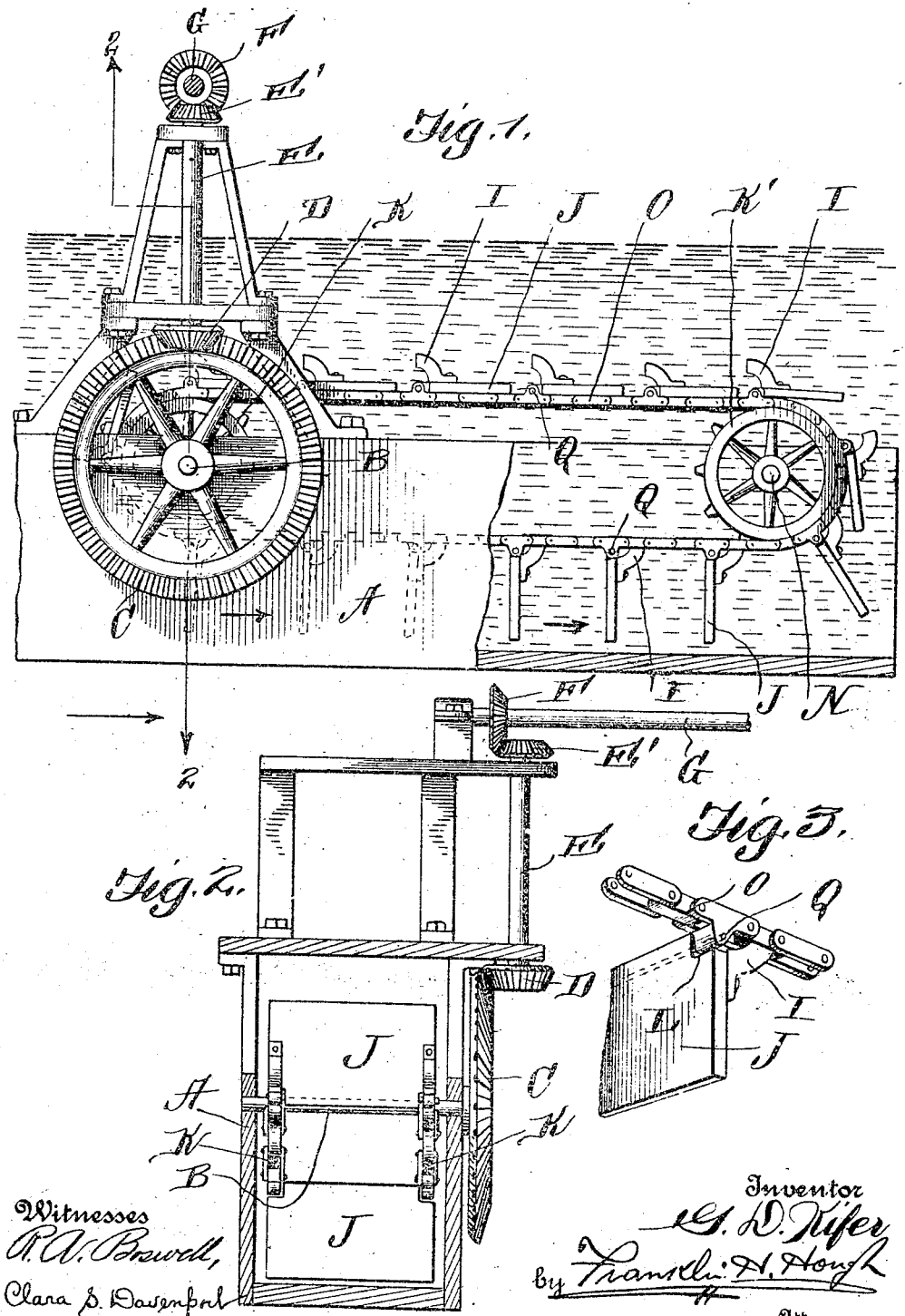

UNITED STATES PATENT OFFICE.

GLENN DORE KIFER, OF REPUBLIC, WASHINGTON.

CURRENT WATER-WHEEL.

No. 825,841.

Specification of Letters Patent.

Patented July 10, 1906.

Application filed March 27, 1905. Serial No. 252,299.

*To all whom it may concern:*

Be it known that I, GLENN DORE KIFER, a citizen of the United States, residing at Republic, in the county of Ferry and State of Washington, have invented certain new and useful Improvements in Current Water-Wheels; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in current water-wheels; and the object of the invention is to produce a simple and efficient apparatus of this nature comprising an endless chain carrying a series of feathering wings or blades, suitable means being provided to hold the wings with their blades at right angles to the travel of the chain when being acted upon by the current of water.

The invention consists, further, in various details of construction and combinations and arrangements of parts, which will be hereinafter fully described and then specifically defined in the appended claim.

My invention is illustrated in the accompanying drawings, in which—

Figure 1 is a view showing the application of my current-utilizing power. Fig. 2 is a sectional view through the same, and Fig. 3 is an enlarged detail perspective view of a portion of one of the wings or blades and the chain carrying the same.

Reference now being had to the details of the drawings by letter, A designates a frame, which may be of any suitable material and has mounted in suitable bearings therein a shaft B, upon one end of which is a bevel-gear C, which is in mesh with a bevel-pinion D, fixed to a shaft E, mounted vertically in the frame, and the upper end of the shaft E carries a pinion-wheel E' in mesh with a gear-wheel F upon the shaft G, whereby power may be transmitted from the shaft B to any point.

Mounted upon the shaft B and adapted to rotate therewith are the sprocket-wheels K, and K' designates sprocket-wheels which are fixed to a shaft N and also mounted in suitable bearings in the frame. About the respective sprocket-wheels K and K' travel the sprocket-chains O, in the opposite links of which are mounted rods Q, upon which the wings J are mounted, as clearly shown in Fig. 3 of the drawings. Fixed to each wing or blade is an arm I, the free end of which is adapted to contact with one of the connecting-links G intermediate the links to which the wings are connected for the purpose of holding the wings at right angles to the travel of the chain, as shown clearly in Fig. 1 of the drawings.

It will be observed that each of the blades or wings has a recessed portion L adjacent to its pivotal connection with the link and that each rod Q passes through an aperture in a projecting portion of links of the chain, thereby allowing the wing or blade to swing freely without interference with the links which carry the blades.

In operation it is my purpose to submerge my motor apparatus a sufficient depth so that it will not be interfered with by ice or objects floating upon the surface of the stream, and after securely anchoring the same in place the current coming in contact with the blades upon the lower portion of the endless chain will assume positions at right angles to the travel of the chain, as shown in Fig. 1 of the drawings, and receive the force of the current, thereby causing the chain to move, and as the blades approach the sprocket-wheel they will feather in the manner shown in solid lines in Fig. 1, thus offering small resistance to the current.

While I have shown a particular form of apparatus illustrating my invention, it will be understood that I may vary the details of the same, if desired, without in any way departing from the spirit of the invention.

Having thus fully described my invention, what I claim as new, and desire to secure by Letters Patent, is—

In combination with a current-motor apparatus, a suitable trough, shafts mounted in the walls thereof, sprocket-wheels fixed to said shafts and mounted within the trough, power-transmitting gear mechanism fixed to one of said shafts, endless chains passing about said sprocket-wheels, said chains being made up of links, lugs projecting from certain of the links of said chains, with connections between said lugs, wings having their inner marginal edges recessed, a rod passing through each of said wings and through the lugs and connections between the same, the connecting portion of each pair of lugs turning in a recess in the wing, bracket-arms fastened to corresponding faces of said wings adjacent to the ends thereof and having their free ends at right angles to the faces of said wings and adapted to bear against connecting-links intermediate the links having said lugs, whereby the wings may resist the power of the current while being acted upon thereby, as set forth.

In testimony whereof I hereunto affix my signature in presence of two witnesses.

GLENN DORE KIFER.

Witnesses:
  R. W. HUNNER,
  S. ROTHCHILD.